US012179200B2

(12) United States Patent
Murton et al.

(10) Patent No.: US 12,179,200 B2
(45) Date of Patent: Dec. 31, 2024

(54) MICROFLUIDIC DEVICE WITH DEP ARRAYS

(71) Applicant: QUANTUMDX GROUP LIMITED, Newcastle Upon Tyne (GB)

(72) Inventors: Heather Murton, Newcastle Upon Tyne (GB); Lothar Schmid, Newcastle Upon Tyne (GB); Eduardo Boada, Newcastle Upon Tyne (GB)

(73) Assignee: QUANTUMDX GROUP LIMITED, Newcastle Upon Tyne (GB)

(*) Notice: Subject to any disclaimer, the term of this patent is extended or adjusted under 35 U.S.C. 154(b) by 959 days.

(21) Appl. No.: 17/275,637

(22) PCT Filed: Sep. 12, 2019

(86) PCT No.: PCT/EP2019/074325
§ 371 (c)(1),
(2) Date: Mar. 11, 2021

(87) PCT Pub. No.: WO2020/053328
PCT Pub. Date: Mar. 19, 2020

(65) Prior Publication Data

US 2022/0040696 A1 Feb. 10, 2022

(30) Foreign Application Priority Data

Sep. 12, 2018 (GB) ...................................... 1814833

(51) Int. Cl.
*B01L 3/00* (2006.01)

(52) U.S. Cl.
CPC ... *B01L 3/502761* (2013.01); *B01L 2200/025* (2013.01); *B01L 2200/027* (2013.01);
(Continued)

(58) Field of Classification Search
CPC ......... B01L 3/502761; B01L 2200/027; B01L 2200/04; B01L 2300/0819; B01L 2300/12; B01L 2400/0424
See application file for complete search history.

(56) References Cited

U.S. PATENT DOCUMENTS

| | | | | |
|---|---|---|---|---|
| 2003/0029714 A1* | 2/2003 | Pethig | ...................... | C12Q 1/24 204/164 |
| 2005/0196855 A1 | 9/2005 | Gau | | |

(Continued)

FOREIGN PATENT DOCUMENTS

| | | |
|---|---|---|
| JP | 2009014342 A | 1/2009 |
| JP | 2011083665 A | 4/2011 |

(Continued)

OTHER PUBLICATIONS

Bhattacharya, S., et al., PCR-based detection in a micro-fabricated platform, Lab on a Chip, Royal Society of Chemistry, vol. 8, No. 7, pp. 1130-1136, 2008.

(Continued)

*Primary Examiner* — C. Sun
(74) *Attorney, Agent, or Firm* — Knobbe, Martens, Olson & Bear, LLP

(57) ABSTRACT

Microfluidic device having a plurality of microfluidic channels and corresponding dielectrophoresis (DEP) electrode arrays, each channel arranged to direct fluid over a DEP electrode array such that in use target particles are manipulated by the DEP electrode array. The device also has a first connection point and second connection point for connecting the device to an alternating current source, a first input of each DEP electrode array connected to the first connection point via the first conductor and second input of each DEP electrode array connected to the second connection point via the second conductor. A resistance of the first conductor between the first input of each electrode and the
(Continued)

first connection point, and a resistance of the second conductor between the second input of each electrode and the second connection point is substantially at least an order of magnitude less than a total resistance of the connected electrode arrays.

13 Claims, 5 Drawing Sheets

(52) U.S. Cl.
CPC ... *B01L 2200/04* (2013.01); *B01L 2200/0647* (2013.01); *B01L 2300/0819* (2013.01); *B01L 2300/12* (2013.01); *B01L 2400/0424* (2013.01)

(56) References Cited

U.S. PATENT DOCUMENTS

| | | | | |
|---|---|---|---|---|
| 2008/0283402 | A1 | 11/2008 | Peach | |
| 2010/0075311 | A1 | 3/2010 | Barrault | |
| 2010/0267162 | A1 | 10/2010 | Kartalov | |
| 2011/0139620 | A1 * | 6/2011 | Stumber | B03C 5/005 204/601 |
| 2014/0116881 | A1 | 5/2014 | Chapman | |
| 2015/0001081 | A1 | 1/2015 | Lu | |
| 2016/0299138 | A1 * | 10/2016 | Almasri | G01N 27/02 |
| 2018/0117592 | A1 * | 5/2018 | Hur | C12N 13/00 |

FOREIGN PATENT DOCUMENTS

| | | | |
|---|---|---|---|
| JP | 2012034641 | A | 2/2012 |
| JP | 2015-534810 | A | 12/2015 |
| JP | 2018057372 | A | 4/2018 |
| WO | WO 2010/080978 | A2 | 7/2010 |
| WO | WO 2014/207618 | A1 | 12/2014 |
| WO | WO 2017/148785 | A1 | 9/2017 |

OTHER PUBLICATIONS

International Search Report & Written Opinion mailed on Nov. 5, 2019 in International Application No. PCT/EP2019/074325.

* cited by examiner

MICROFLUIDIC DEVICE WITH DEP ARRAYS

PRIORITY AND CROSS REFERENCE TO RELATED APPLICATIONS

This application is the U.S. National Stage Application under 35 U.S.C. § 371 of International Application No. PCT/EP2019/074325, filed Sep. 12, 2019, designating the U.S. and published in English as WO 2020/053328 A1 on Mar. 19, 2020, and which claims the benefit of Great Britain Patent Application No. GB 1814833.8, filed Sep. 12, 2018. Any and all applications for which a foreign or a domestic priority is claimed is/are identified in the Application Data Sheet filed herewith and is/are hereby incorporated by reference in their entireties under 37 C.F.R. § 1.57.

TECHNICAL FIELD

The present invention relates to microfluidic devices, and microfluidic devices that use dielectrophoresis (DEP) to selectively manipulate target particles.

BACKGROUND

Dielectrophoresis (DEP) is a well-known phenomenon that can be used to selectively move and/or manipulate particles based on the dielectric properties of the particles. The particle will move either in the direction of a field gradient (positive DEP) or in the opposite direction (negative DEP).

In particular, a DEP array (comprising for example an interdigitated electrode array) can be adapted, based on its geometry and the voltage and frequency of an electrical power source connected to the array, to selectively manipulate certain specific particles from a fluid being passed over the DEP array.

In principle, DEP provides a promising particle selection mechanism for microfluidic diagnostic applications where, for example, fluid samples are processed to identify and analyse fluid-borne pathogen particles or particles associated with pathogens. Examples include the analysis of fluid samples from patients to identify the presence and quantity of *Mycobacterium tuberculosis* cells to diagnose and assess the severity of a tuberculosis infection.

Generally, to produce a commercially viable point of care (POC) microfluidic diagnostic device, the device must be able to provide an accurate diagnosis within an acceptable period of time. This constraint typically dictates a minimum flow rate of the sample through the device in order to reach a diagnosis from the sample in an acceptable period of time. To achieve the requisite level of sample flow in a device that is of a commercially acceptable size and cost, it is typically necessary to provide multiple parallel processing channels, each channel performing the same diagnostic process (e.g. isolating particles of interest).

Unfortunately, when attempting to implement a DEP-based particle manipulation system in a microfluidic device comprising multiple parallel processing channels, a number of technical issues arise. For example, a DEP electrode array must be carefully "tuned" to ensure that the electric field it generates targets the desired particles. Devices comprising multiple DEP electrode arrays, whilst necessary for commercial implementation, are nevertheless difficult to implement because variances within the device tend to result in the DEP electrode arrays performing differently from each other (e.g. capturing target particles at inconsistent rates).

Beyond a certain tolerance level, such differences in performance can lead to unreliable diagnostic results.

Further, implementing a microfluidic device comprising multiple DEP electrode array requires comparatively high-levels of power to be supplied to the device to drive the electrodes. To avoid unacceptable levels of power-dissipation through heating, it is therefore necessary to increase the quantity of conducting material connecting the DEP electrode arrays with the power supply. However, at the scales and geometries typically associated with commercially practical microfluidic POC devices (for example disposable cassettes that are inserted into analysis devices), simply increasing the quantity of conducting material can be difficult as the conducting material may delaminate from the surface of the substrate due to the poor adhesion properties of the conducting material.

It is an aim of certain embodiments of the invention to at least partly address the above drawbacks with the prior art.

SUMMARY OF THE INVENTION

In accordance with a first aspect of the invention, there is provided a microfluidic device comprising a plurality of microfluidic channels and a plurality of corresponding dielectrophoresis DEP electrode arrays. Each microfluidic channel is arranged to direct fluid over a DEP electrode array. The device further comprises a first connection point and second connection point for connecting the device to an alternating current source, a first input of each DEP electrode array connected to the first connection point via a first conductor and second input of each DEP electrode array connected to the second connection point via a second conductor. The resistance of the first conductor between the first input of each electrode and the first connection point, and the resistance of the second conductor between the second input of each electrode and the second connection point is substantially at least an order of magnitude less than the total resistance of the connected electrode arrays.

Where the DEP electrode array utilises positive DEP (pDEP) the microfluidic channel is arranged such that in use target particles are held or attracted towards the DEP electrode array.

Optionally, each DEP electrode array is associated with only one microfluidic channel.

Optionally, the DEP electrode arrays are electrically connected in parallel.

Optionally, the first connection point and second connection points are the only connection points on the device.

Optionally, the DEP electrode arrays each comprise an interdigitated electrode (IDE) array.

Optionally, each IDE array comprises a first set of electrodes comprising 5 to 40 electrodes interdigitated with a second set of electrodes comprising 5 to 40 electrodes.

Optionally, each IDE array is approximately 2 mm to 8 mm in length and 2.7-3.0 mm in width. In some cases, a secondary IDE array is provided which is 1.7 mm in width.

Optionally, each IDE array consists of 50 μm wide fingers, with a separation distance of 50 μm.

Optionally, each IDE array is operable at peak to peak voltages of approximately 12V (4V RMS), to generate an average electric field of approximately 80 kV/m RMS.

Optionally, the DEP electrode arrays each have a resistance of 1.6-2.4 kΩ. This is for a conductivity of 150-220 μS/cm and 2 mm wide and 4 mm long electrodes.

This DEP electrode array resistance depends on the solution conductivity. With different samples or sample preparation methods, this will change considerably. It also depends on the IDE array width.

Optionally, the device is a microfluidic cassette insertable in a corresponding analysis device.

Optionally, the device comprises at least 2 DEP electrode arrays.

More commonly the device comprises more than 2 DEP electrode arrays.

The preferred number of DEP electrodes to some extent depends on the sample and cells of interest. For example, when testing sputum samples, it can be advantageous to have more than 2 DEP electrodes to allow for enough flow through—however in cases where there were a lot of cells of interest present it is feasible to use only 2 DEP electrodes).

Optionally, the first and second conductors comprising conducting leads.

Optionally, the conducting leads comprise conducting material deposited on a substrate.

Optionally, each of the conducting leads comprise one or more internal gaps absent of conducting material to increase an edge-length of the conducting leads.

Optionally, the conducting material comprises gold, platinum or aluminium. The conducting material can also comprise multiple layers, with the upper surface layer being gold, platinum or aluminium and an optional lower substrate layer being e.g. nickel or tantalum. The lower substrate layer is typically included to improve adhesion, and for the upper layer, typically a biocompatible material is used. For example, the conducting material may be 5 um nickel with a thin gold layer on top.

Optionally, the target particles are target cells.

In accordance with certain aspects of the invention, a technique is provided for arranging microfluidic devices comprising a plurality of DEP electrode arrays, typically connected in parallel and powered from a common pair of connection points. The technique recognises in particular that if, for each electrode array, the total resistance between the connection points and corresponding DEP electrode array inputs is an order of magnitude less than the total resistance of the connected DEP electrode arrays calculated by;

$$R_{total} = \left( \sum_{i=1}^{n} \frac{1}{R_i} \right)^{-1}$$

then any differences arising in operation of the DEP due to variances in the resistance to and from the connection points to the electrode inputs, remain within an acceptable level.

References to X being an 'order of magnitude less' than Y refer to X being less or equal to 1/10th of Y.

By virtue of this recognition, microfluidic devices can be provided that comprise multiple DEP electrode arrays, arranged for example in parallel and, advantageously powered from a single set of connection points, without the consistency of the operation of the DEP electrode arrays falling below acceptable levels. Unacceptable levels of inconsistency would be expected to occur in microfluidic arrangements in this configuration without this specific recognition or higher than necessary amounts of conducting material would be necessary for the conductors increasing the cost and size of the device.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
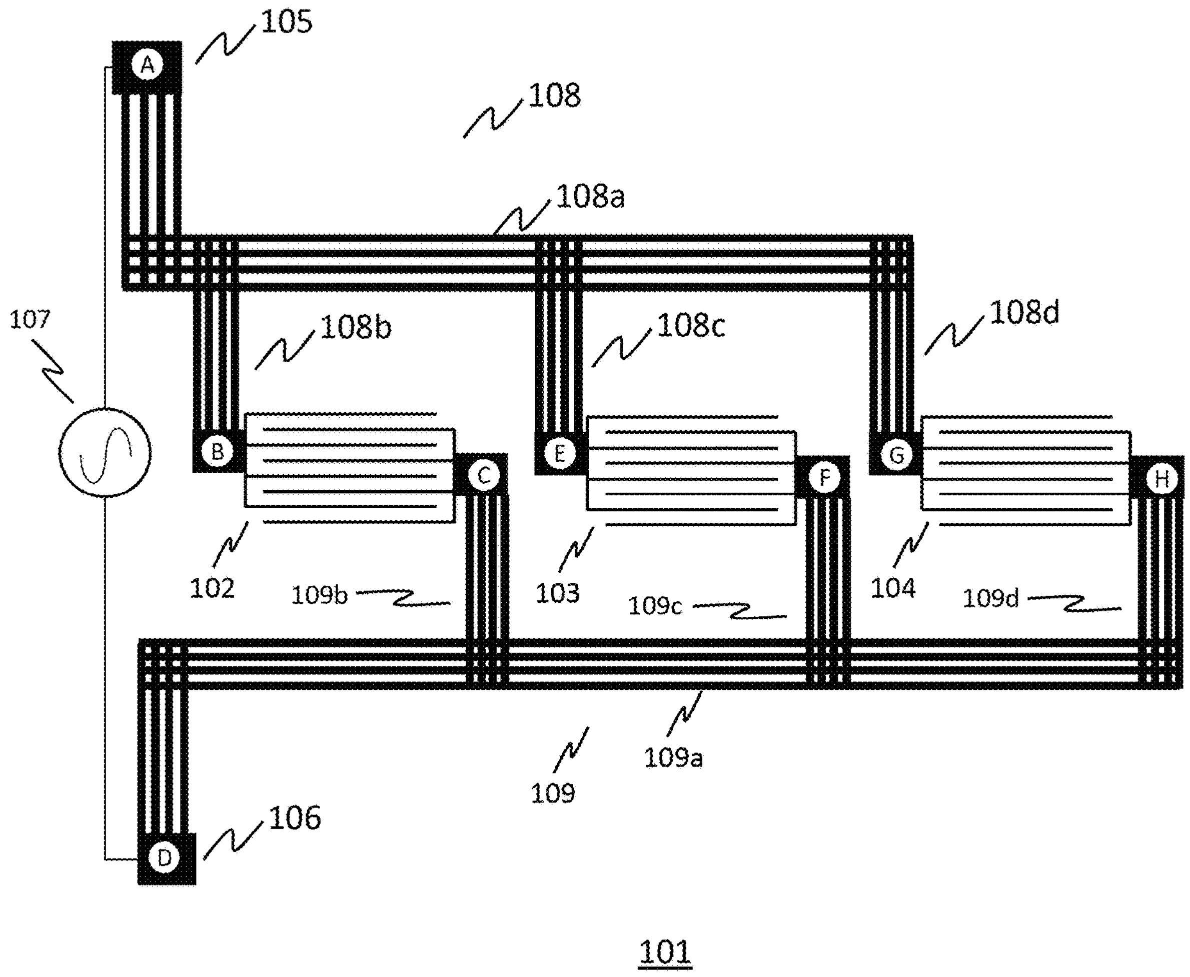
FIG. 1 provides a simplified schematic diagram of an arrangement for supplying an alternating current to a plurality of electrode arrays for use in a microfluidic device for selectively capturing target particles using dielectrophoresis (DEP)

FIG. 1 provides a simplified schematic diagram of an arrangement for supplying an alternating current to a plurality of electrode arrays for use in a microfluidic device for selectively capturing target particles using dielectrophoresis (DEP). The examples described use positive DEP (pDEP).

The arrangement 101 comprises a first electrode array 102, second electrode array 103 and third electrode array 104. Each electrode array comprises an interdigitated electrode (IDE) array. In a typical implementation, more electrode arrays may be used (for example 32 parallel channels each with its own electrode array—each channel being 2 mm in width—gives an appropriate footprint for a POC device), but for clarity only three are shown in FIG. 1.

Whilst the figures show a linear interdigitated electrode array, it would be understood that arrays of differing physical conformations could be used, for example interdigitated spiral electrodes could be used.

The first, second and third electrode arrays 102, 103, 104 are connected via conducting leads to a connection point provided by a first supply pad 105 and a further connection point provided by a second supply pad 106. In use, the supply pads are connected to an alternating current source 107.

The first, second and third electrode arrays 102, 103, 104 are connected in parallel. More specifically, the first supply pad 105 is connected to a first input of the first electrode array 102, to a first input of the second electrode array 103 and to a first input of the third electrode array 104, via a first conducting lead 108. The first conducting lead 108 includes a main branch **108*a* which is common to all of the electrode arrays; a first sub-branch 108*b* which connects with the first input of the first electrode array 102; a second sub-branch 108*c* which connects with the first input of the second electrode array 103, and a third sub-branch 108*d* which connects with the first input of the third electrode array 104. The second supply pad 106 is connected to a second input of the first electrode array 102, to a second input of the second electrode array 103 and to a second input of the third electrode array 104, via a second conducting lead 109. The second conducting lead 109 includes a main branch 109***a* which is common to all of the electrode arrays; a first sub-branch 109*b* which connects with the second input of the first electrode array 102; a second sub-branch 109*c* which connects with the second input of the second electrode array 103, and a third sub-branch 109*d* which connects with the second input of the third electrode array 104.

In use, the arrangement shown in FIG. 1 forms part of a microfluidic device. Operation of such a device is described in more detail with reference to FIG. 2.

Figure 2:
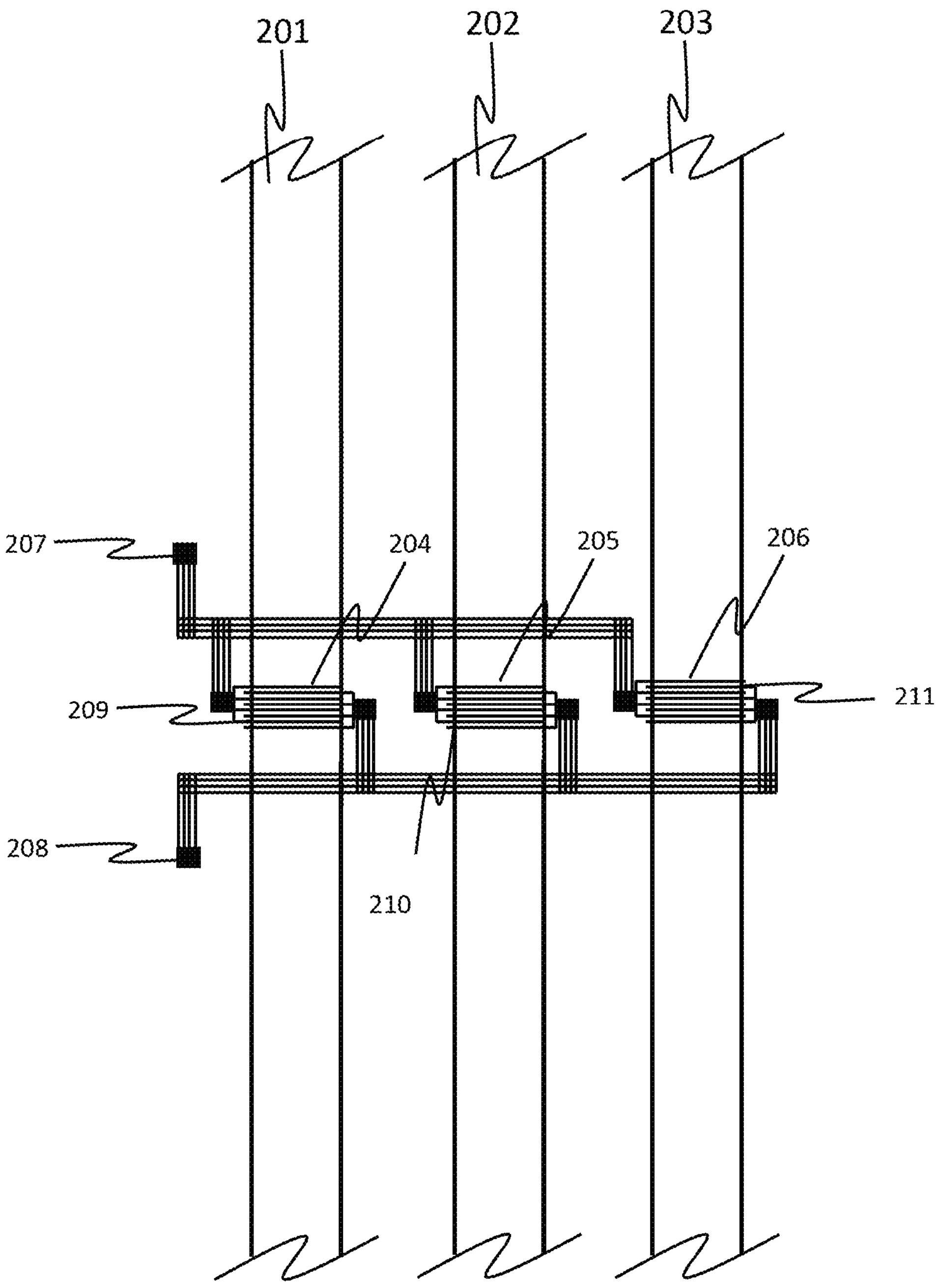
FIG. 2 provides a simplified schematic diagram of part of a microfluidic device comprising a plurality of microfluidic channels.

FIG. 2 provides a simplified schematic diagram of part of a microfluidic device comprising a plurality of microfluidic channels 201, 202, 203. Each microfluidic channel passes over a corresponding electrode array 204, 205, 206. The electrode arrays are each electrically connected in parallel and connected to a first supply pad 207 and second supply pad 208 via a first conducting lead and second conducting lead as described above. The region of each microfluidic channel that passes over the corresponding electrode array (referred to as the "DEP bed") is where target particles are attracted and held during operation. The DEP beds 209, 210, 211 are typically of larger width than the microfluidic channels at the point that the channel crosses the DEP bed—this ensures all sample crosses the electrodes (it does not flow around the outside).

In operation, an alternating current is applied to the supply pads 207, 208. The alternating current propagates through the first and second conducting lead establishing an alternating electric field at each DEP bed 209, 210, 211. Fluid, containing target particles, flows through each of the microfluidic channels. Assuming that the voltage and frequency of the alternating current is selected correctly, as target particles pass through each DEP bed, they are attracted to the electrode due to the dielectrophoresis effect and held within the DEP bed.

In one example, the device is arranged to target *M. tuberculosis* cells and to concentrate them for visualisation and further processing. In such an arrangement, the electrode arrays are typically have 20 pairs of electrode fingers, with the array having a bed width of 2.7 mm to cross a 2 mm channel and a total length of approximately 4 mm (each electrode finger width and spacing between fingers being 50 microns) and the AC supply provides a peak to peak voltage of approximately 12V (4V RMS) at a frequency of 10 MHz which generates an average field of 80 kV/m RMS.

When looking at *M. tuberculosis* the sample fluid is typically sputum from a human subject (although it would be understood that a wide range of cells could be targeted and other biological sample material could be used including resuspended swab material, blood, plasma, saliva etc.) which has been subject to pre-processing such as thinning with buffers and de-salting.

In this way, processing and/or analysis of the fluid can be performed. For example, if each target particle is tagged with a fluorescent marker, the number of target particles trapped or held in each DEP bed after a predetermined amount of flow time can be assessed by visual inspection using optical equipment such as a microscope (not shown).

Alternatively, or additionally, once the fluid containing the target particles has passed through the device and the target particles are held in the DEP beds, a second fluid can be passed through the microfluidic channels whilst the alternating current is reduced or switched off. The target particles are thus released into the second fluid which can be flushed into a further chamber (not shown) for further processing or analysis or eluted from the device. This provides a more concentrated sample for downstream processing such as lysis, PCR (polymerase chain reaction) and nucleic acid detection.

For accurate analysis of the target particles, particularly for analysis that involves estimating the volume of target particles in a fluid sample, it is important that the DEP bed operate consistently. That is, the dielectrophoresis effect is consistent so that each DEP bed attracts and holds target particles to the same degree. For consistent operation of each DEP bed it is important to ensure that the difference in the electric field produced by each electrode array is minimised.

As can be understood with reference to FIG. 2, given that only one set of supply pads are used, from left to right, the electrode arrays are progressively further from the first and second supply pads.

The further an electrode from the supply pads, the further the alternating current must propagate through conducting material before it reaches the electrode. Thus, the total resistance between the supply pads and the electrodes progressively increase as the electrodes increase in distance from the supply pads. This difference in resistance means that the voltage at each electrode array, and thus electric field produced at each DEP bed, is different. Therefore, the dielectrophoresis effect is different at each DEP bed so that target particles are not attracted and held to the same degree.

Figure 3:
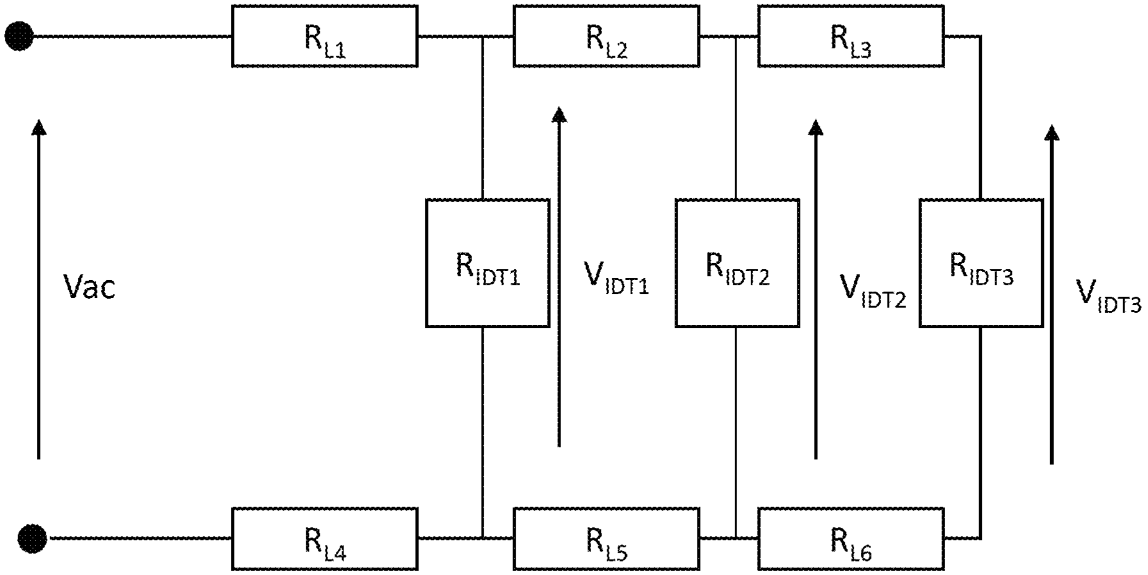
FIG. 3 provides a diagram depicting an equivalent circuit of the arrangement shown in FIG. 1 comprising three electrode arrays connected in parallel and supplied by a single pair of supply pads.

This is depicted in the equivalent circuit shown in FIG. 3 which is the equivalent circuit for the arrangement shown in FIG. 1 comprising three electrode arrays connected in parallel and supplied by a single pair of supply pads.

FIG. 3 shows that the resistance between the supply pads for the first electrode array is different to the resistance between the supply pad and the second electrode array resulting in a difference in the voltage (and thus difference in the strength of the electric fields) at each electrode array.

More specifically, FIG. 3 shows the resistance of the first electrode array ($R_{IDE1}$), second electrode array ($R_{IDE2}$) and third electrode array ($R_{IDE3}$). FIG. 3 further shows the resistance ($R_{L1}$) of portions of the first conducting lead 108 between the first supply pad 105 and the first input of the first electrode array; the "additional" resistance ($R_{L2}$) of portions of the first conducting lead 108 between the first supply pad 105 and the first input of the second electrode array, and the further "additional" resistance ($R_{L3}$) of portions of the first conducting lead 108 between the first supply pad 105 and the first input of the third electrode array.

FIG. 3 further shows the resistance ($R_{L4}$) of portions of the second conducting lead 109 between the second supply pad 106 and the second input of the first electrode array; the "additional" resistance ($R_{L5}$) of portions of the second conducting lead 109 between the first supply pad 105 and the second input of the second electrode array, and the further "additional" resistance ($R_{L6}$) of portions of the second conducting lead 109 between the second supply pad 106 and the second input of the third electrode array.

As can be appreciated with reference to FIG. 3, although the electrode arrays are connected in parallel, due to the different total resistance amounts between each electrode input and supply pad, for a given voltage input Vac, the voltages over each electrode will be different. That is $V_{IDE1}$ is greater than $V_{IDE2}$ which is greater than $V_{IDE3}$.

Figure 4:
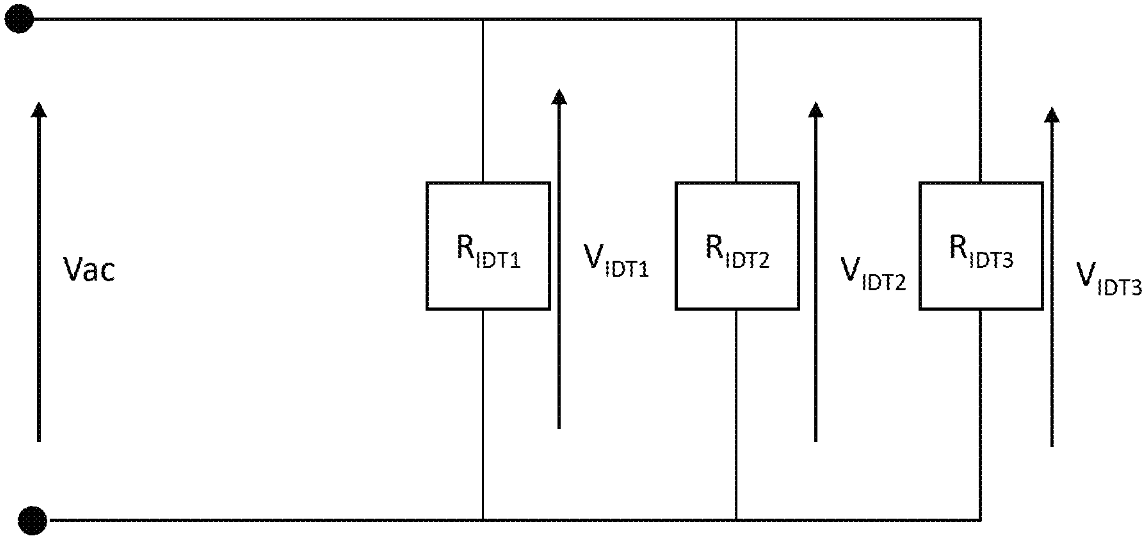
FIG. 4 provides a diagram depicting an ideal case in which the resistance of the conducting leads is zero.

To minimise the difference between $V_{IDE1}$, $V_{IDE2}$ and $V_{IDE3}$, it is necessary to reduce, as far as possible, the resistance of the conducting leads (e.g. $R_{L1}$, $R_{L2}$, $R_{L3}$, $R_{L4}$ $R_{L5}$ and $R_{L6}$ in FIG. 3). Indeed, in an ideal implementation, the resistance of the conducting leads (e.g. $R_{L1}$, $R_{L2}$, $R_{L3}$, $R_{L4}$ $R_{L5}$ and $R_{L6}$ in FIG. 3) will be zero. In such an ideal case, the equivalent circuit of FIG. 3 would simply become the resistance of the three electrode arrays in parallel (as shown in FIG. 4) and in which case, the voltage (and thus electric field) across the electrode arrays would be same.

It is therefore desirable to reduce as far as possible the resistance of the conducting leads. This can be achieved by increasing the conducting lead conductivity which, for any given conducting material can be achieved by increasing the width or thickness of the conducing material forming the conducting leads. However, in implementations in which size is a critical factor (for example point of care (POC) microfluidic devices), the surface area available for depositing conductor material is highly constrained. This same size constraint typically prevents each electrode array being supplied by its own set of supply pads which would otherwise be an alternate means of ensuring a consistent voltage is applied across each electrode array. Increasing the thickness of the leads is also undesirable due to the resulting increase in production costs.

Connecting the electrode arrays in parallel ensures that if there is a failure with one electrode the remaining electrodes will continue to function. Also, by connecting the DEP electrodes in parallel the electrode resistances of each of the individual DEP electrodes do not themselves become relevant as 'lead ins' for downstream electrodes.

In accordance with certain embodiments of the invention, it has been found that for implementations in which multiple electrode arrays are connected in parallel (thus enabling a single set of supply pads to be used to supply the electrodes), if the total resistance of each conducting lead, leading to an electrode is approximately ten times less than the total resistance of each electrode, then the difference between electric fields at each electrode array is sufficiently reduced to ensure acceptable levels of consistent operation.

With reference to FIG. 1, the resistance between point A and point B is the total resistance of the conducting lead from the first supply pad 105 to the first input of the first electrode array 102, the resistance between point B and point C is the resistance of the first electrode array 102 and the resistance between point C and point D is the total resistance of the conducting lead from the second supply pad 106 to the second input of the first electrode array 102. Similarly, the resistance between point A and point E is the total resistance of the conducting lead from the first supply pad 105 to the first input of the second electrode array 103, the resistance between point E and point F is the resistance of the second electrode array 103 and the resistance between point F and point D is the total resistance of the conducting lead from the second supply pad 106 to the second input of the second electrode array 103. Similarly, the resistance between point A and point G is the total resistance of the conducting lead from the first supply pad 105 to the first input of the third electrode array 104, the resistance between point G and point H is the resistance of the third electrode array 104 and the resistance between point H and point D is the total resistance of the conducting lead from the second supply pad 106 to the second input of the third electrode array 104.

Thus, in accordance with certain embodiments of the invention, the difference between the electric fields produced at the first electrode array 102, second electrode array 103 and third electrode array 104 is sufficiently reduced to ensure acceptable levels of consistent operation if: the total resistance for all of the connected electrode arrays 102 (the resistance B and C), 103 (the resistance between E and F) and 104 (the resistance between G and H) calculated as:

$$R_{total} = \left(\sum_{i=1}^{n} \frac{1}{R_i}\right)^{-1}$$

is at least approximately ten times greater than the resistance between point A and point B+the resistance between point C and point D AND the resistance between point A and point E+the resistance between point F and point D AND the resistance between point A and point G+the resistance between point H and point D.

The methods to produce devices with the appropriate resistance ratios would be known to those skilled in the art, resistance balancing can be modelled at the design stage and/or quality control (QC) testing can be carried out to check the ratios.

As described herein, in certain embodiments the appropriate resistance ratio can be provided by controlling the geometry and/or cross-sectional area of the conducting leads.

In other embodiments, instead of or in addition to controlling the geometry and/or cross-sectional area of the conducting leads, the appropriate resistance ratio can be provided by selecting the materials that the conducting leads and/or the electrode arrays are composed of based on the resistivity of these materials. In such embodiments, the material of the conducting leads has a lower resistivity than the material of the electrode arrays.

It will be understood that different combinations of materials for the conducing leads and electrode arrays can be used to provide the appropriate resistance ratio.

Examples of suitable materials for the conducting leads include gold, silver, aluminium, beryllium, titanium or chromium.

Examples of suitable materials for the electrode arrays include aluminium, beryllium, tungsten, zinc, nickel, titanium or platinum.

In certain embodiments, the conducing leads are composed of gold and the electrode arrays are composed of platinum. Advantageously, this combination can provide an appropriate resistance ratio while also improving resistance to oxidation.

In certain embodiments, a non-oxidising protective layer can be provided to cover the conducing leads and/or electrode arrays to reduce or prevent oxidisation.

In certain embodiments, the conducting leads and/or the electrodes arrays can be composed of more than one layer of material to form a "composite" conducting lead or electrode array. For example, the conducting leads and/or the electrodes arrays can be composed of multiple layers made up of different materials.

In one embodiment, a base layer and a top layer are composed of a first material and a middle layer located between the base layer and the top layer is composed of a second material that is different to the first material.

In a further embodiment, a base layer and a top layer are composed of different materials. The base layer can be composed of titanium or chromium to promote adhesion with a substrate. The base layer can be approximately 5-10 nm in depth. The top layer can be composed of aluminium or gold.

In the embodiments described above, the cross-sectional area and/or thickness of each layer can be selected independently to provide the appropriate resistance ratio.

Acceptable levels of consistency across DEP electrodes differ somewhat depending on the sample that is under investigation and the desired efficacy and current test efficacy and efficiency. Preferably, acceptable levels of consistency across different electrode arrays is that the is less than a 25% difference in field strength between electrodes, more preferably a less than 10% difference in field strength between electrodes, more preferably a less than 1% difference in field strength between electrodes.

Too much variance can result in inefficient capture or manipulation of cells in at least some of the channels, and occasionally too much heat occurring in some channels.

As well as the requirement to ensure consistent DEP bed operation described above, it is also desirable to reduce the resistance of the conducting leads to minimise energy dissipation due to heating of the conducting leads and maximise energy dissipation in the electric fields at the DEP beds. This is particularly the cases given the comparatively high power dissipation involved in driving multiple electrode arrays (a device comprising 32 electrode arrays may be expected to consume around 1 W of power.). A particular issue that needs to be addressed with multiple DEP arrays is that the heating of the sample can cause significant problems, as it is particularly concentrated with the DEP arrays in the middle of a cassette which can be difficult to cool.

Conducting leads used in conventional electronic applications of similar scale to microfluidic devices e.g. integrated circuits are typically too small to provide the desired levels of resistance. In other words, the conductance of such conducting leads is too low. In other applications, considerably thicker conductive layers and/or wider leads are used to achieve acceptable levels of conductance.

In order to minimise the resistance of the conducting leads that connect the electrode arrays to the supply pads, it is necessary to increase, as far as possible, the width and/or thickness area of the conducting material from which the conducting leads are formed. Typically, it is necessary to increase the width of the conducting leads beyond the size that might conventionally be used on electronic applications of a similar scale.

However, at the scale of typically microfluidic geometries and using conventional techniques of lift-off lithography in which conducting material is bonded/deposited on a substrate such as a polymer substrate e.g. acrylic or polypropylene, or a glass substrate to form the conducting leads, increasing the surface area of the conductor lead beyond a certain size increases the likelihood of delamination of the conductor material from the substrate. This is because if the ratio of the surface area of the conducting material to the length of its outer edges is below a threshold value, the surface tension of the conductor material at the edges of the conductor lead become greater than the adhesion of the conducting material with substrate. Typically, the ratio of the surface area of the conducting material to the length of its outer edges is reduced by providing the conductor lead with internal gaps to increase the amount of edges. Preferably, the internal gaps are elongate gaps resulting in conducting material with a plurality of elongate sections or portions (this configuration has the additional benefit that if one of the elongate sections has a fabrication defect this does not result in complete failure.

In accordance with embodiments of the invention, the conducting leads are arranged such that both conductor material surface area and the conductor lead edge length are maximised. More specifically, the conducting leads comprise internal gaps, absent conducting material to increase the ratio of the outer edges of the conducting leads with its total surface area. This decreases the surface tension of the conductor material and increases adhesion at the edges of the conducting leads reducing the likelihood of delamination.

Figure 5:
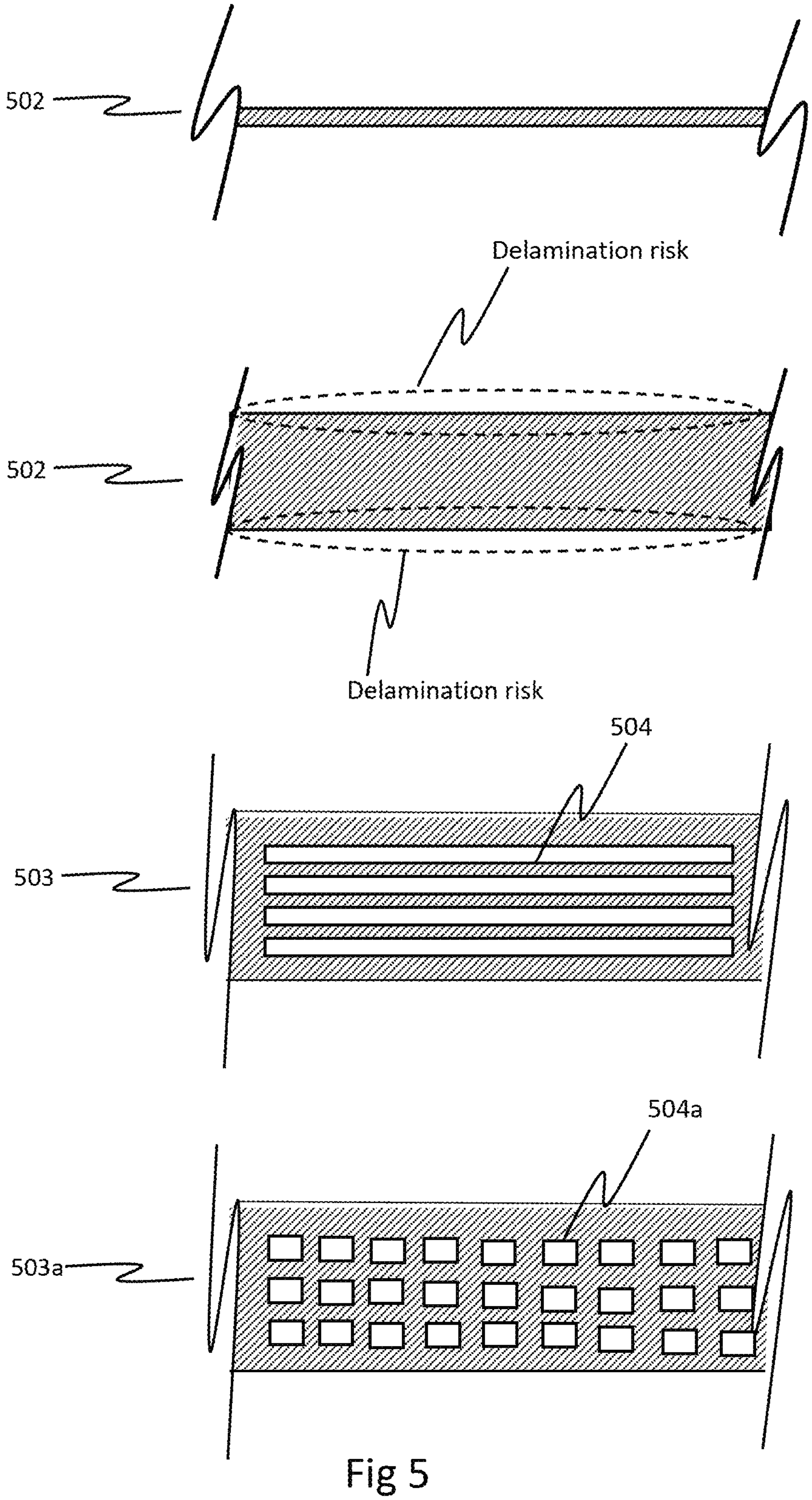
FIG. 5 provides a schematic diagram showing a portion of a conventional conducting lead; a portion of a conventionally modified conducting lead, and a portion of conducting lead in accordance with certain embodiments of the invention, and a portion of conducting lead in accordance with certain alternative embodiments of the invention and FIG. 6 provides an exploded view of a microfluidic cassette that can be arranged in accordance with embodiments of the invention.

This concept is depicted in FIG. 5.

FIG. 5 provides a schematic diagram showing a portion of a conventional conducting lead 501 used in electronics of a similar scale to certain microfluidic applications. The surface area of this conducting lead does not provide enough conducting material to give the desired levels of conductivity for certain microfluidic applications, for example those comprising multiple electrode arrays, an in particular those comprising multiple electrode arrays driven from a single set of supply pads.

FIG. 5 shows a portion of a conventionally modified conducting lead 502 which provides the required levels of conductivity by virtue of an increase in conducting material. However, due to the increase in surface tension, the edges of the conducting lead 502 are at risk of delamination from the substrate.

FIG. 5 further shows a portion of conducting lead 503, 503*a* in accordance with certain embodiments of the invention in which the portion of conducting lead 503, 503*a* provides the required level of conductivity by virtue of increasing the amount of conducting material, but includes internal gaps 504, 504*a*, absent conducting material to increase the ratio of the length of the outer edges of the conductor lead with its total surface area. As can also be seen, the internal gaps 504, 504*a* can be of varying shapes.

In the embodiment shown in FIG. 1, the conducting leads 107*a*, 107*b*, 107*c*, 108*a*, 108*b*, 108*c* that connect the electrodes to the supply pads are provided by a plurality of connected parallel conducting lines separated by gaps. The provision of multiple connected conducting lines introduces internal gaps within the conducting lead and thereby the total edge length of the conducting leads which therefore reduces the risk of delamination of the conducting leads from the substrate.

It will be understood that gaps of any suitable shape and size can be used. For example, in some cases the gaps may be square cutouts instead of parallel elongate sections.

Figure 6:
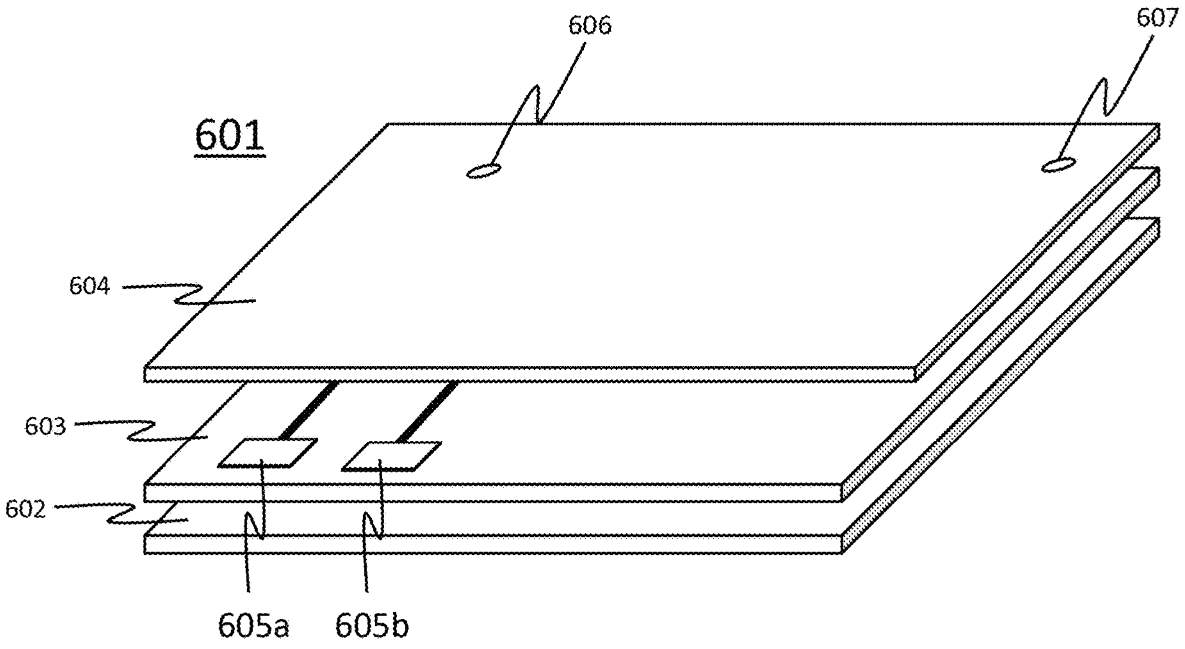

FIG. 6 provides a schematic diagram of a microfluidic device in accordance with certain embodiments of the invention.

More specifically, FIG. 6 provides an exploded view of a microfluidic cassette 601 comprising a first substrate layer 602, typically comprising polypropylene. On the substrate layer 602 is a conducting layer 603 comprising electrode arrays, conducting leads and a pair of supply pads as described above. In particular, as described above, the electrode arrays, conducting leads and supply pads are arranged such that the resistance of the conducting leads between the input of each electrode and the supply pads is substantially at least an order of magnitude less than the total resistance of the connected electrode arrays. Further, in certain embodiments, as described above, the conducting leads comprise internal gaps, absent conducting material to increase the ratio of the outer edges of the conducting leads with its total surface area.

On the conducting layer is a microfluidic channel layer 604 comprising the microfluidic channels arranged to direct fluid over the electrode arrays forming DEP beds in which target particles are attracted and held.

The microfluidic channel layer 604 extends over parts of the conducting layer comprising the electrode arrays but leaves exposed the supply pads 605*a*, 605*b* for connection to an AC supply. The microfluidic channel layer 604 comprise an inlet port 606 for through which fluid to be analysed is driven and a corresponding outlet port 607 through which fluid that has passed through the cassette exits.

In use, the microfluidic cassette is inserted in a point of care analysis device which receives a fluid sample, performs any necessary pre-processing steps (for example changing the viscosity of the fluid, the salt content (ionic strength) adding dyes or fluorophores and so on) and then drives the fluid (via suitable microfluidic pumping as is well known in the art) into the inlet port 606. At the same time, insertion of the microfluidic cassette is such that an AC supply is brought into contact with the supply pads 605*a*, 605*b*. The AC supply provides an alternating current at a predetermined frequency and voltage which, given the geometry of the electrodes, causes target particles to be held within the DEP beds as the fluid flows through the microfluidic cassette. The cassette holder can also provide some level of cooling to the cassette.

As described above, in one mode of operation, once the analysis device has driven the fluid sample in its entirety through the microfluidic cassette, the analysis device drives a second fluid, for example purified water, through the microfluidic cassette and the AC supply is disconnected/switched off. In this way, the target particles are released from the DEP beds an exit the cassette, via the outlet port 607 and can be collected in a collection chamber. Analysis of the target particles in the collection chamber can then be performed by the analysis device.

As will be understood, the above describes one possible implementation of a microfluidic device in accordance with certain embodiments of the invention.

Whilst the above describes a particular embodiment, it would be understood that in a simple embodiment there is no complex chip with a separate point of care (POC) device. The cassette or chip is a standalone microfluidic chip device which flows sample through the multiple channels, cells of interest are manipulated by the DEP electrode such that they are held on or in the vicinity of the DEP electrodes, and the DEP electrodes are then simply viewed under a microscope to see if cells have been held and are present—or are not.

Similarly, in more complex variants the microfluidics could be combined on a single cassette to allow concentration and additional processing such as lysis, PCR, molecular detection etc.

The electrode arrays have both a resistance (due to solution conductivity) and a reactance (the electrode fingers act as capacitors), while the leads have only resistance. Throughout the document we refer to electrode array "resistance", because the electrode array reactance does not need to be taken into account in the embodiment described above. In fact for "typical" solution conductivities and at 10 MHz the electrode reactance would be negligible as far as voltage drop is concerned. However, if the sample conductivity were decreased, or the frequency increased considerably, it could become relevant. With this in mind, the term "resistance" should be understood as the magnitude of the AC impedance.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

What is claimed is:

1. A microfluidic device comprising:

a plurality of microfluidic channels and a plurality of corresponding dielectrophoresis (DEP) electrode arrays, wherein each microfluidic channel is configured to direct fluid over a DEP electrode array, and at least one first connection point and at least one second connection point configured to connect the microfluidic device to an alternating current source, wherein:

a first input of each DEP electrode array is connected to the at least one first connection point via a first conductor, and a second input of each DEP electrode array is connected to the at least one second connection point via a second conductor, and an electrical resistance of the first conductor between the first input of each DEP electrode array and the at least one first connection point, and an electrical resistance of the second conductor between the second input of each DEP electrode array and the at least one second connection point is each substantially at least an order of magnitude less than a total electrical resistance of the plurality of DEP electrode arrays, wherein the first and second conductors comprise conducting leads comprising a conducting material deposited on a substrate, and wherein each of the conducting leads comprises one or more internal gaps absent the conducting material to increase an edge-length of the conducting leads.

2. The microfluidic device according to claim 1, wherein each DEP electrode array is associated with only one microfluidic channel.

3. The microfluidic device according to claim 1, wherein the plurality of DEP electrode arrays is electrically connected in parallel.

4. The microfluidic device according to claim 1, wherein the at least one first connection point and the at least one second connection point are the only connection points on the device.

5. The microfluidic device according to claim 1, wherein each of the plurality of DEP electrode arrays comprises an interdigitated electrode (IDE) array.

6. The microfluidic device according to claim 5, wherein each IDE array comprises a first set of electrodes comprising 5 to 40 electrodes interdigitated with a second set of electrodes comprising 5 to 40 electrodes.

7. The microfluidic device according to claim 5, wherein each IDE array is approximately 2 mm to 8 mm long.

8. The microfluidic device according to claim 7, wherein each IDE array is operable to generate an average electric field of approximately 80 kV/m RMS.

9. The microfluidic device according to claim 1, wherein each of the plurality of DEP electrode arrays has a resistance of 1.6-2.4 kΩ.

10. The microfluidic device according to claim 1, wherein the microfluidic device is a microfluidic cassette insertable in a corresponding analysis device.

11. The microfluidic device according to claim 1, comprising at least two DEP electrode arrays.

12. The microfluidic device according to claim 1, wherein the conducting material comprises gold, nickel, platinum, or aluminum.

13. The microfluidic device according to claim 1, wherein the microfluidic device is configured for selectively manipulating target particles by DEP, wherein the target particles are target cells.

* * * * *